United States Patent [19]
Looman et al.

[11] Patent Number: 5,142,734
[45] Date of Patent: Sep. 1, 1992

[54] GLIDE SUPPORT ASSEMBLY

[75] Inventors: James A. Looman, Holland; Thomas I. Kane, West Olive, both of Mich.

[73] Assignee: Herman Miller, Inc., Zeeland, Mich.

[21] Appl. No.: 588,364

[22] Filed: Sep. 26, 1990

[51] Int. Cl.$^5$ ............... B60B 33/04; A47B 91/06; B21B 15/00; F16M 11/12
[52] U.S. Cl. .................... 16/19; 16/32; 16/42 R; 29/33 D; 29/897; 248/180; 248/188.4; 72/368
[58] Field of Search ............ 16/42 R, 32, 33, 19, 16/42 T, 100, 105; 248/180, 188.1, 188.4, 157, 182, 188.2, 188.5, 650, 677, 685, 688; 29/33 D, 33 T, 33.2, 432, 432.2, 433, 434, 444, 464, 882, 897; 411/372; 403/348; 72/51, 362, 367, 368

[56] References Cited

U.S. PATENT DOCUMENTS

| | | |
|---|---|---|
| 587,489 | 8/1897 | Patten . |
| 650,232 | 5/1900 | Diss ................... 16/42 R |
| 753,762 | 3/1904 | Uhl . |
| 1,155,269 | 9/1915 | Petersen ............. 16/42 T |
| 1,470,423 | 10/1923 | Brady .................. 16/32 |
| 2,272,848 | 2/1942 | Miller ................ 248/188.4 |
| 2,323,699 | 7/1943 | Babros . |
| 2,339,577 | 1/1944 | Nalle ................. 16/19 |
| 2,499,277 | 2/1950 | Nalle ................. 16/42 R |
| 3,150,853 | 9/1964 | Lisbin . |
| 3,175,795 | 3/1965 | Adams . |
| 3,191,212 | 6/1965 | Reiss, Sr. et al. ....... 16/42 R |
| 3,428,108 | 2/1969 | Singer . |
| 3,653,341 | 4/1972 | Nielsen . |
| 3,669,393 | 6/1972 | Paine et al. ........... 248/188.4 |
| 3,742,552 | 7/1973 | Balchunas ............. 16/42 R |
| 3,797,184 | 3/1974 | Thompson . |
| 3,844,518 | 10/1974 | Long . |
| 4,187,578 | 2/1980 | Little ................... 29/897 |
| 4,231,630 | 11/1980 | Propst et al. . |
| 4,266,310 | 5/1981 | Perrault et al. .......... 72/51 |
| 5,040,758 | 8/1991 | Giovannetti ........... 248/188.4 |

FOREIGN PATENT DOCUMENTS

| | | | |
|---|---|---|---|
| 235293 | 11/1960 | Australia ............. 16/42 R |
| 0076617 | 5/1984 | Japan .................. 72/51 |
| 0321029 | 12/1989 | Japan .................. 72/51 |

Primary Examiner—Lowell A. Larson
Assistant Examiner—Thomas C. Schoeffler
Attorney, Agent, or Firm—Varnum, Riddering, Schmidt & Howlett

[57] ABSTRACT

A glide support assembly for adjustably mounting a glide on an article, such as a divider panel for dividing a building into a room area. This particularly relates to the details of a support tube arrangement which is inexpensively constructed from sheet metal and is rolled into a tubular form. An upper portion of the tube is provided with axial lances while below the axial lances there are transverse lances which serve to support a washer which restricts the penetration of the upper portion of the tube into the article. In order to save metal, the lower portion of the tube is of a reduced diameter.

17 Claims, 2 Drawing Sheets

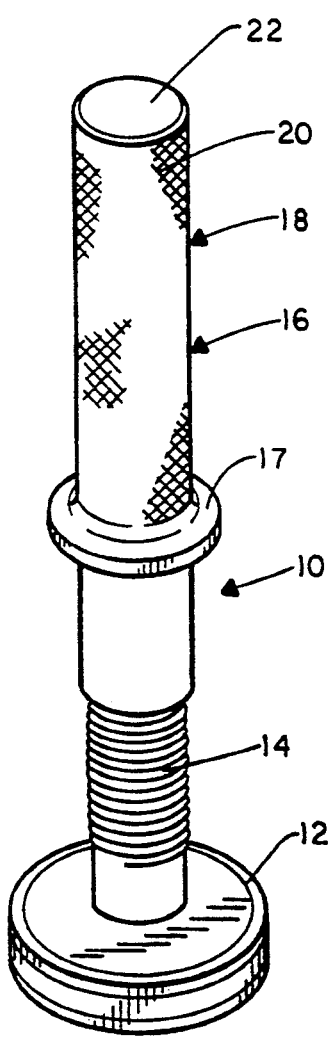
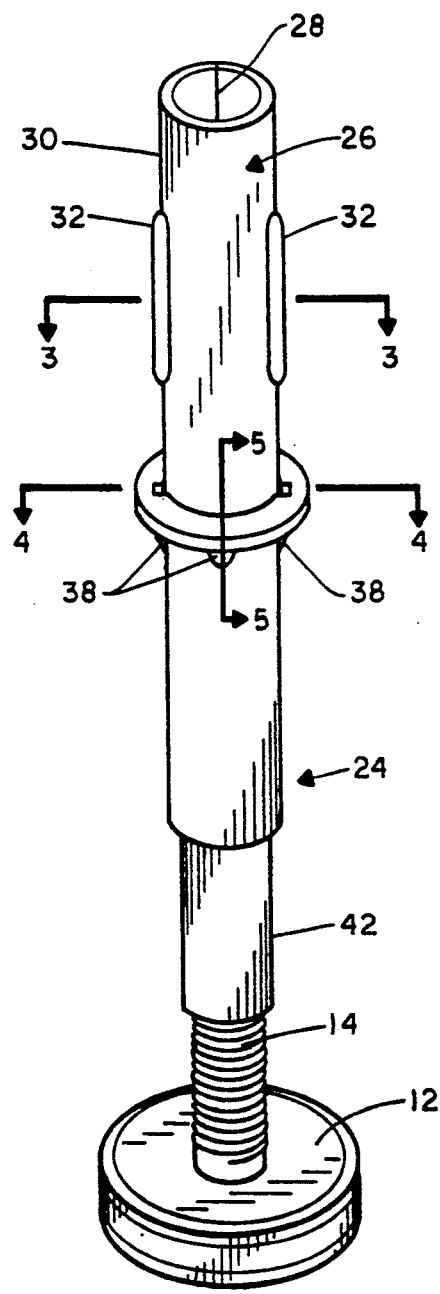
FIG. 1
(PRIOR ART)
FIG. 2

GLIDE SUPPORT ASSEMBLY

BACKGROUND OF THE INVENTION

1. Technical Field

This invention relates in general to new and useful improvements in a glide support assembly and more particularly to a panel glide support assembly which may be economically rolled from sheet metal and which may be provided with rotation preventing means and stop means in the form of lances formed from the metal of such rolled tube.

2. State of the Prior Art

The well known open plan office panels have vertically adjustable glides at the bottom thereof, wherein the glides are particularly useful in adjustably supporting a movable wall panel. At the present, the glide includes a screw threaded stem which carries at its lower end a glide element. The stem is screw threaded into a lower portion of a seamless steel tube which is headed and is forced into a bore of an article, such as a panel, to be supported. Such an arrangement is shown generally in U.S. Pat. No. 587,489 to Patten although a nut is threaded onto the glide stem as opposed to the tube being internally threaded. Further, the seamless tube in the current glide has the upper portion thereof knurled so that it may be driven into a bore into the article to be supported and thus prevented from rotation relative to the article. The presently utilized glide support assembly is illustrated in FIG. 1.

U.S. Pat. No. 3,428,108 to Singer issued Feb. 18, 1969, also discloses panels supported by adjustable glides. Propst et al. U.S. Pat. No. 4,231,630 issued Nov. 4, 1980, discloses another vertically adjustable glide arrangement for panels.

SUMMARY OF THE INVENTION

In accordance with this invention, it has been found that the cost of a support assembly for a glide may be greatly reduced if the tube is rolled from sheet metal and has a middle portion of a larger diameter than an internally threaded lower portion which screw threadly receives the stem of the glide.

In lieu of knurling, lances are formed on the upper part of the rolled tube for driving into the panel.

Also, suitable stop means for limiting the movement of the tube into the article are in the form of additional lances below the upper lances and have upwardly directed faces on which there is seated a washer. Preferably, the washer is trapped between the upper and lower lances by providing the washer with interior notches so that the washer may slide down over the upper part of the tube including the upper lances.

Further, it is preferred that the lower portion of the tube, which is internally threaded for receiving the screw threaded stem of the glide, is made of a smaller diameter than the middle portion.

Finally, according to the invention, there is provided a method for forming a glide assembly comprising the steps of forming a sheet of stock material into a tubular shape, forming a first integral stop along an upper portion of the tubular shape to retard rotation of the tubing in an aperture, forming a second integral stop on the middle portion of the tubular shape below the first integral stop to retard the movement of the tubular shape axially into the aperture and tapping a lower portion of the tubular shape to threadably receive a threaded glide member. Preferably, the method of forming the glide assembly include the step of positioning a washer on the upper portion of the tubular shape between the first and second integral stops to further restrict the axial movement of the tubular shape into the aperture. Preferably, the first forming step and the second forming step comprise lancing the tubular shape to form the stops.

BRIEF DESCRIPTION OF THE DRAWINGS

Further objects, features and advantages of the present invention will become apparent from a consideration of the following description when taken in connection with the appended claims and the accompanying drawing in which:

FIG. 1 is a top perspective view of a prior art glide support assembly which has been in use prior to this invention;

FIG. 2 is another top perspective view of the present glide support assembly which is the subject of this invention;

DESCRIPTION OF THE PREFERRED EMBODIMENT

Figure 3:
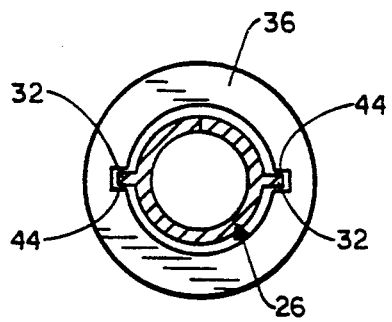
FIG. 3 is a transverse horizontal sectional view taken generally along the line 3—3 of FIG. 2 and shows how the stop washer is notched to clear the upper lances.
Figure 4:
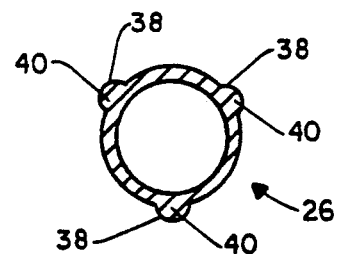
FIG. 4 is a transverse horizontal sectional view taken generally along the line 4—4 of FIG. 2 and shows the specific formation of transverse lances to provide upper seats on which the washer is seated.
Figure 5:
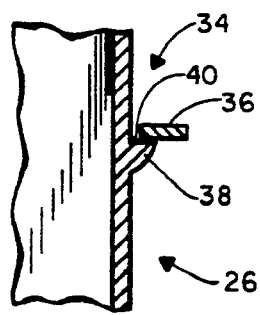
FIG. 5 is a fragmentary vertical sectional view taken generally along the line 5—5 of FIG. 2 and shows further the details of the transverse lances and the supporting of the washer thereon.

Referring now to the drawings in detail, reference is first made to the PRIOR ART showing of FIG. 1 wherein there is illustrated a glide support assembly generally identified by the numeral 10. The glide support assembly includes a lowermost glide 12 having an upstanding externally threaded stem 14. The glide 12 is vertically supported relative to an article by way of a support 16 in the form of a length of seamless tubing 18. The tubing 18 is internally threaded and is screw threaded therein to the stem 14. An upper portion of the tubing 18 is externally knurled as at 20. The knurling 20 prevents rotation of the tubing 18 within a bore formed in an article to be supported by the glide 12. A headed flange 17 is formed beneath the knurling as a stop on the tube 18.

It has been found that the utilization of the seamless tubing 18 together with the specific work to be preformed thereon is rather expensive. Accordingly, there has been provided a modified form of glide support assembly generally identified by the numeral 24 and illustrated best in FIG. 2. The assembly 24 will utilize the same type of glide 12 with the externally threaded stem 14. It will, however, utilize a different type of support assembly which includes an elongated tube 26 which is rolled from a flat sheet of metal and which has a longitudinal open seam 28.

The tube 26 has an open upper end and will include an upper portion 30 to be received within a bore as will be described in detail hereinafter. The upper portion 30 is provided with a reduced diameter lead in portion 31 and a set of axial lances 32 which are formed from the metal of the tube 26. The axial lances 32 function as rotation preventing means as will be described in further detail hereinafter.

In order to restrict the amount that the tube 26 is driven into a bore, an intermediate part of the tube 26 includes stop means generally identified by the numeral 34. Stop means 34 includes a flat washer 36 which is prevented from moving down on the tube 26 beyond a preselected point by a set of circumferentially spaced transverse lances 38 which are also formed of the material of the tube 26. The washer 36 seats on upper faces 40 of the lances 38 and will bear against the underside of an article into which the upper portion 30 of the tube 26 projects.

It will be apparent from FIG. 2 that the tube 26 includes a lower portion 42 which is of a reduced diameter as compared to the diameter of the intermediate portion and upper portion 30. The lower portion 42 is internally threaded so as to receive the screw threaded stem 14.

It will be seen that the construction of the tube 26 permits the upper portion 30 to be of a larger diameter than the lower portion 42. It is also understood that the upper portion 30 and the lower portion 42 are in axial alignment.

In order that the washer 36 may be generally trapped between the axial lances 32 and the transverse lances 38, as is best shown in FIG. 3, the washer 36 is provided with internal notches 44 to match and clear the axial lances 32, as is best shown in FIG. 3. This permits the washer 36 to be assembled with the tube 26 after the lances 32 and 38 have been formed. A slight rotation of the washer 36 after assembly prevents the washer from passing upwardly past the axial lances 32.

Figure 6:
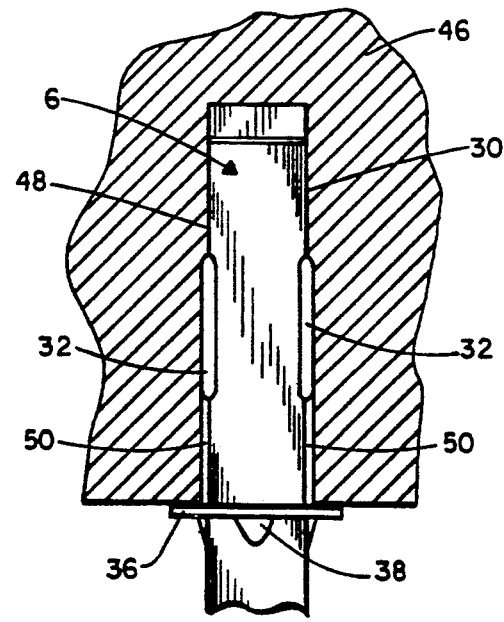
FIG. 6 is a schematic sectional view on a smaller scale showing specifically the relationship between the glide support assembly and an article, such as a portion of a panel.

Referring now to FIG. 6, it will be seen that there is illustrated an article 46 which may be part of a room dividing panel or the like. The article 46 is provided with a bore 48 which may be deeper than the distance of the upper surface of the washer 36 to the extreme end of the tube 26, as is shown in FIG. 6. When the upper portion 30 of the tube 26 is driven into the article 46, the axial lances 32 will cut grooves 50 in the wall of the bore 48 and thus prevent rotation of the tube 26 within the article 46.

The tube 26 is driven into the bore 48 until the washer 36 seats against the underside of the article 46 and prevents further penetration of the tube 26 into the article 46.

The glide 12 is rotatable relative to the lower portion 42 of the tube 26 so as to vertically adjust the glide 12.

The tube 26 is preferably made from suitable metal sheet stock, such as low carbon steel, which is considerably less expensive than seamless tube stock. The tube can be roll formed into the tubing, cut to length and then mechanically lanced to form the stops in simple mechanical operations. The tubing can then be tapped to form the screw threads. The washer 36 can then be assembled onto the tube. The tube 26, thus formed, is far less expensive than the prior art seamless tube assembly illustrated in FIG. 1.

Although only a preferred embodiment of the glide support assembly has been specifically illustrated and described herein, it is to be understood that minor variations may be made in the glide support assembly without departing from the spirit and scope of the invention as defined by the appended claims.

The embodiments of the invention for which an exclusive property or privilege is claimed are defined as follows:

1. A glide support assembly comprising a length of tubing having upper and lower portions, said lower portion defining an internal screw thread for threadedly receiving a threaded stem of a glide, an upper portion for reception in a bore in an article to be supported by such glide, said upper portion being formed with a rotation preventing projections to be driven into an article for preventing rotation of said tubing into an article bore, and a stop positioned below said upper portion for limiting movement of said tubing into an article, characterized in that said tubing is formed of rolled sheet metal and has a longitudinal seam.

2. A glide support assembly according to claim 1 wherein said stop includes a set of upwardly facing transverse lances which extend outwardly from an outer surface of said tubing.

3. A glide support assembly according to claim 1 wherein said stop includes a set of upwardly facing transverse lances with said transverse lances extending outwardly from an outer surface of said tubing and having upwardly facing stop surfaces, 4. A glide support assembly according to claim 1 wherein said stop includes a set of upwardly facing transverse lances with said transverse lances extending outwardly from an outer surface of said tubing and having stop surfaces facing upwardly, and a washer seated on said stop surfaces.

5. An office panel supported at a bottom portion thereof by a glide support assembly in accordance with claim 1.

6. A glide support assembly as defined in claim 1 wherein said lower portion is of a lesser diameter than said upper portion.

7. A glide support assembly as defined in claim 2 wherein said lower portion and said upper portion are axially aligned.

8. A glide support assembly according to claim 1 wherein said rotation preventing projections are in the form of a set of axial lances which project from an outer surface of said tubing.

9. A glide support assembly according to claim 8 wherein said stop includes a set of upwardly facing transverse lances which extend outwardly from the outer surface of said tubing.

10. A glide support assembly according to claim 8 wherein said stop includes a set of upwardly facing transverse lances with said transverse lances extending outwardly from the outer surface of said tubing and having upwardly facing stop surfaces.

11. A glide support assembly according to claim 8 wherein said stop includes a set of upwardly facing transverse lances with said transverse lances extending outwardly from the outer surface of said tubing and having stop surfaces facing upwardly, and a washer seated on said stop surfaces.

12. A glide support assembly according to claim 11 wherein said washer has interior notches complementary with said axial lances, whereby said washer can be slid down over said upper portion and said axial lances, and, upon rotation, is generally trapped between said transverse lances and said axial lances.

13. A method for forming a glide assembly, comprising the steps of:
forming a sheet of stock material into a tube shape;

forming a first integral stop along an upper portion of said tubular shape to retard rotation of the tubing in an aperture;

forming a second integral stop on an upper portion of said tubular shape below the first integral stop to retard the movement of the tubular shape axially into said aperture; and tapping a lower portion of said tubular shape to threadably receive a threaded glide member.

14. A method for forming a glide assembly according to claim 13 and further comprising the step of positioning a washer on the upper portion of the tubular shape between the first and second integral stops to further restrict the axial movement of said tubular shape into said aperture.

15. A method of forming a glide assembly according to claim 13 wherein the step of forming the second integral stop comprises lancing the tubular shape.

16. A method of forming a glide assembly according to claim 13 wherein the step of forming a first integral stop comprises lancing the tubular shape.

17. A method of forming a glide assembly according to claim 16 wherein the step of forming the second integral stop also comprises lancing the tubular shape.

* * * * *